United States Patent [19]
Niki et al.

[11] Patent Number: 5,786,675
[45] Date of Patent: Jul. 28, 1998

[54] SUNROOF CONTROL CIRCUIT

[75] Inventors: Kenich Niki; Nobuo Yoshioka; Hiroyuki Funaki, all of Yokohama, Japan

[73] Assignee: Jidosha Denki Kogyo Kabushiki Kaisha, Yokohama, Japan

[21] Appl. No.: 675,058

[22] Filed: Jul. 3, 1996

[30] Foreign Application Priority Data

Jul. 4, 1995 [JP] Japan ................................. 7-169043

[51] Int. Cl.$^6$ ............................................. G05B 5/00
[52] U.S. Cl. ..................... 318/466; 318/467; 318/286; 318/266
[58] Field of Search ........................... 318/466, 467, 318/286, 266

[56] References Cited

U.S. PATENT DOCUMENTS 5,184,050  2/1993  Harada et al. ............... 318/466

FOREIGN PATENT DOCUMENTS

495518  8/1992  Japan .

Primary Examiner—Karen Masih
Attorney, Agent, or Firm—Sughrue, Mion, Zinn, Macpeak & Seas, PLLC

[57] ABSTRACT

A sunroof control circuit for controlling a sunroof lid in a sliding and a tilting mode, which comprises an electric motor, a first and a second motor driving circuit for driving the electric motor in the forward and reverse direction, a position detecting switch provided with a contactor, and an arc-shaped first and a second contact plate disposed on a circle with the same radius, a switch means for generating signals to actuate the sunroof lid in respective directions, a first, a second and a third prohibition circuit for prohibiting or permitting signals to be supplied to the respective motor driving circuits in accordance with the position of the sunroof lid detected through the position detecting switch, and a motor-lock detecting circuit for detecting the motor to be locked and stopping current supply to the motor according to the detection of the motor locking.

9 Claims, 5 Drawing Sheets

SUNROOF CONTROL CIRCUIT

BACKGROUND OF THE INVENTION

1. Field of the Invention

This invention relates to a sunroof control circuit used for detecting a situation of a sunroof lid of a sunroof system equiped on a motor vehicle, and controlling the sunroof lid between sliding mode and tilting mode.

2. Description of the Prior Art

A sunroof motor housing a position detector and a control circuit for detecting a situation of the sunroof lid and for controlling movements of the sunroof lid is disclosed in Japanese Utility Model Disclosure (KOKAI) No.4-095518/92.

The sunroof motor disclosed in the aforementioned document is provided with a motor shaft connected mechanically with the sunroof lid, a rotary body transmitted with rotation of the motor shaft after speed reduction, and a contactor disposed on the rotary body. The sunroof motor is so designed as to detect the sunroof lid to be in a full-closed state, in a opening state or in a tilting state on basis of electric contact of the contactor with one of three contact plates disposed on a basal plate according to the rotation of the rotary body.

Namely, in the aforementioned sunroof motor, a first contact plate, a second contact plate and a third contact plate are arranged respectively on threefold coaxial circles having different radiuses with each other insulatedly on a basal plate disposed with devices to form a circuit. When a geneva drive (rotary body) turns according to the rotation of the motor shaft, the contactor is connected electrically with the first contact plate, second contact plate or third contact plate, respectively in accordance with the position of the sunroof lid, thereby detecting the condition of the sunroof lid. Therefore, it is necessary to dispose the first, second and third contact plates independently on respective coaxial circles differing from each other in their radiuses, and a wide space is required for disposing the contact plates, whereby the basal plate to be arranged with the contact plates becomes larger. Accordingly, there is a problem in that it is not possible to avoid scaling up of the motor body and it becomes difficult to install the sunroof motor in a relatively narrow space between roof outer panel and roof inner panel of the vehicle body.

SUMMARY OF THE INVENTION

This invention is made in view of the aforementioned problem of the prior art, and it is an object to provide a sunfoof control circuit which is provided with a simply structured position detecting switch for detecting the condition of the sunroof lid and possible to control the sunroof lid appropriately by detecting the position of the sunroof lid very accurately.

The sunroof control circuit according to this invention is provided with a position detecting switch composed of a movable contactor, a first contact plate and a second contact plate, and the first and second contact plates are disposed away from each other in a circle with the same radius. Therefore, the wide space is not required for disposing the contact plates of the position detecting switch.

The sunroof control circuit according to this invention is further provided with a switch means having switches for generating signals for opening, closing, tilting up and tilting down the sunroof lid, and a first prohibition circuit for prohibiting or permitting signals to be supplied to respective motor driving circuits in accordance with the position of the sunroof lid detected through the position detecting switch. Therefore, the sunroof lid is not actuated even if "CLOSE" switch or "TILT DOWN" switch is operated when the sunroof lid is in the full-closed position.

The sunroof control circuit according to another embodiment of this invention is further provided with a second and a third prohibition circuits for prohibiting signals to be supplied to the respective motor driving circuits in response to the position of the sunroof lid detected through the position detecting switch. Therefore, the sunroof lid is never actuated even if "OPEN" switch or "CLOSE" switch is operated when the sunroof lid is in the tilting mode, and "TILT UP" switch or "TILT DOWN" switch is operated when the sunroof lid is in the sliding mode.

The sunroof control circuit according to the other embodiment of this invention is further provided with a motor-lock detecting circuit for inhibiting the signals generated from the respective switches to be supplied to the motor driving circuits when the rotation of an electric motor to actuate the sunroof lid is restricted. Therefore, the electric motor is prevented from the overheat and damage even if "TILT UP" switch or "OPEN" switch is operated continuously even after the sunroof lid arrives at the tilt up position or full-opened position.

DESCRIPTION OF THE PREFERRED EMBODIMENT

An embodiment of the sunroof control circuit according to this invention will be explained below on basis of FIG. 1 to FIG. 5.

Figure 1:
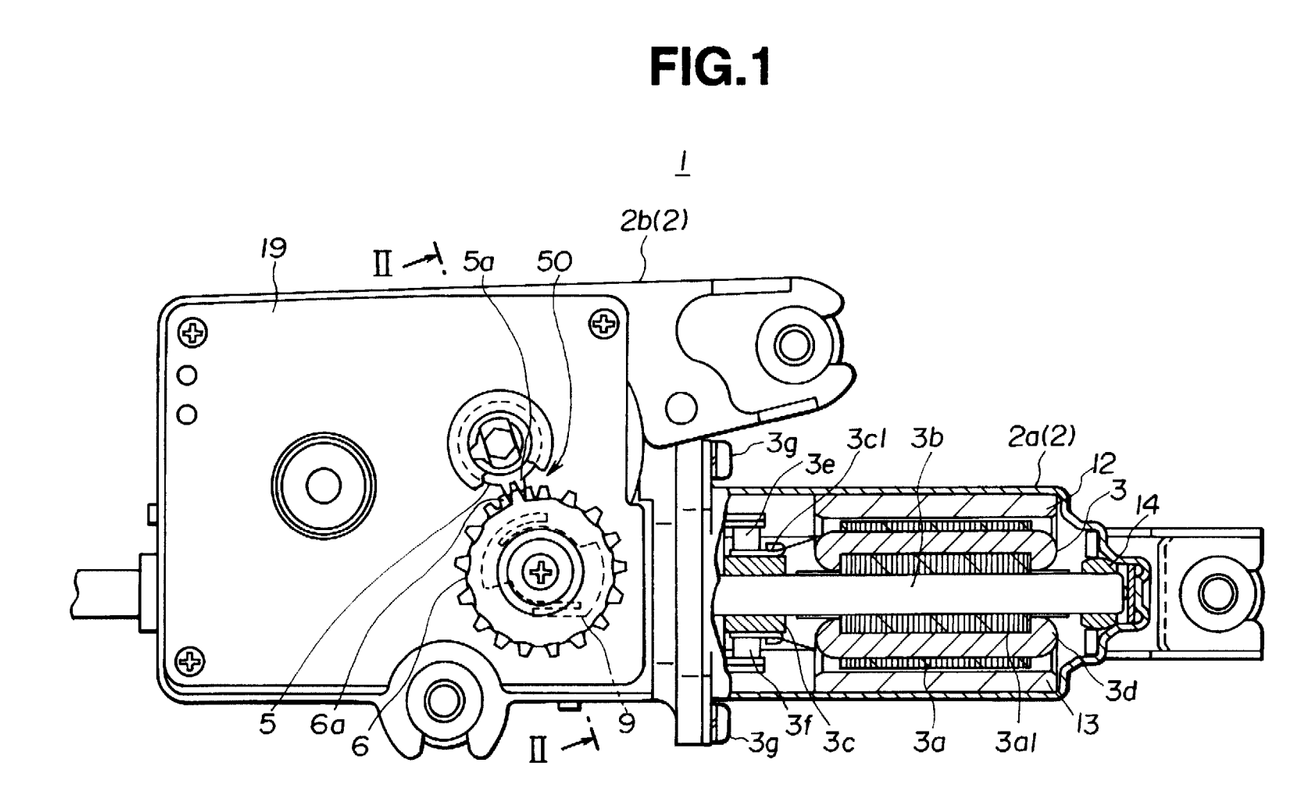
FIG. 1 is a partly sectional side view of a sunroof motor housing a sunroof control circuit according to an embodiment of this invention.
Figure 2:
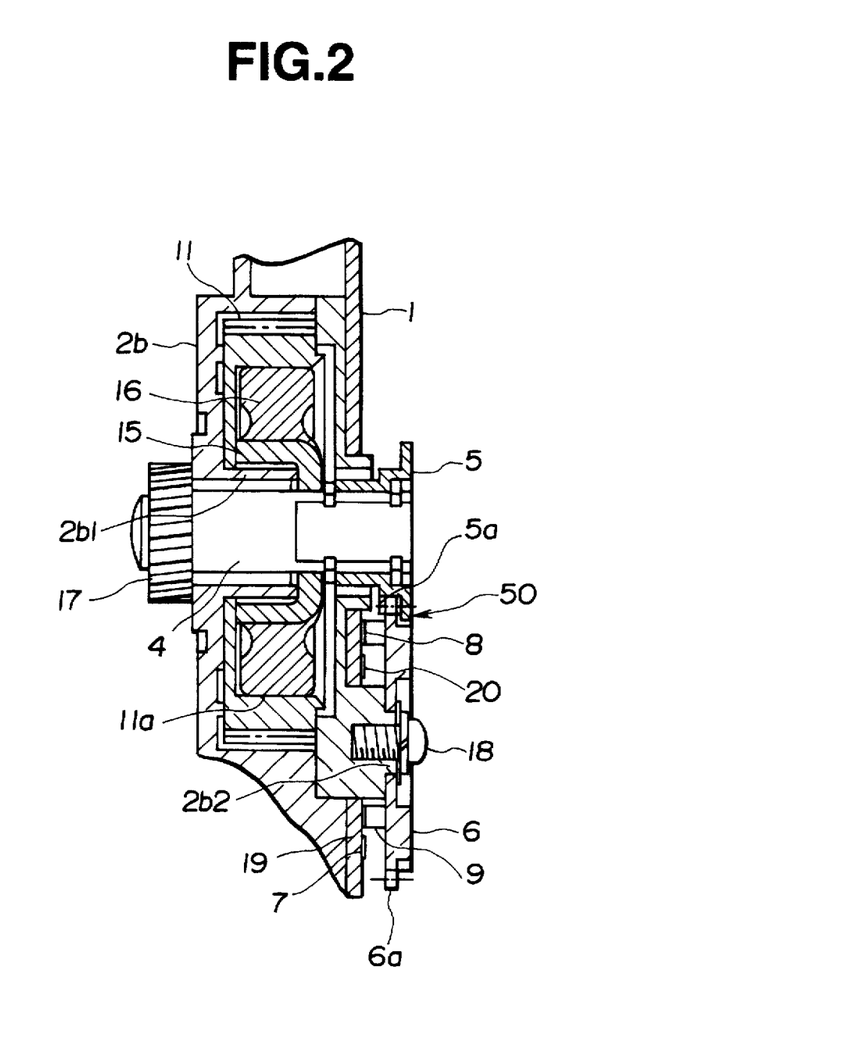
FIG. 2 is a cross-sectional view along section lines II—II of FIG. 1.
Figure 5:
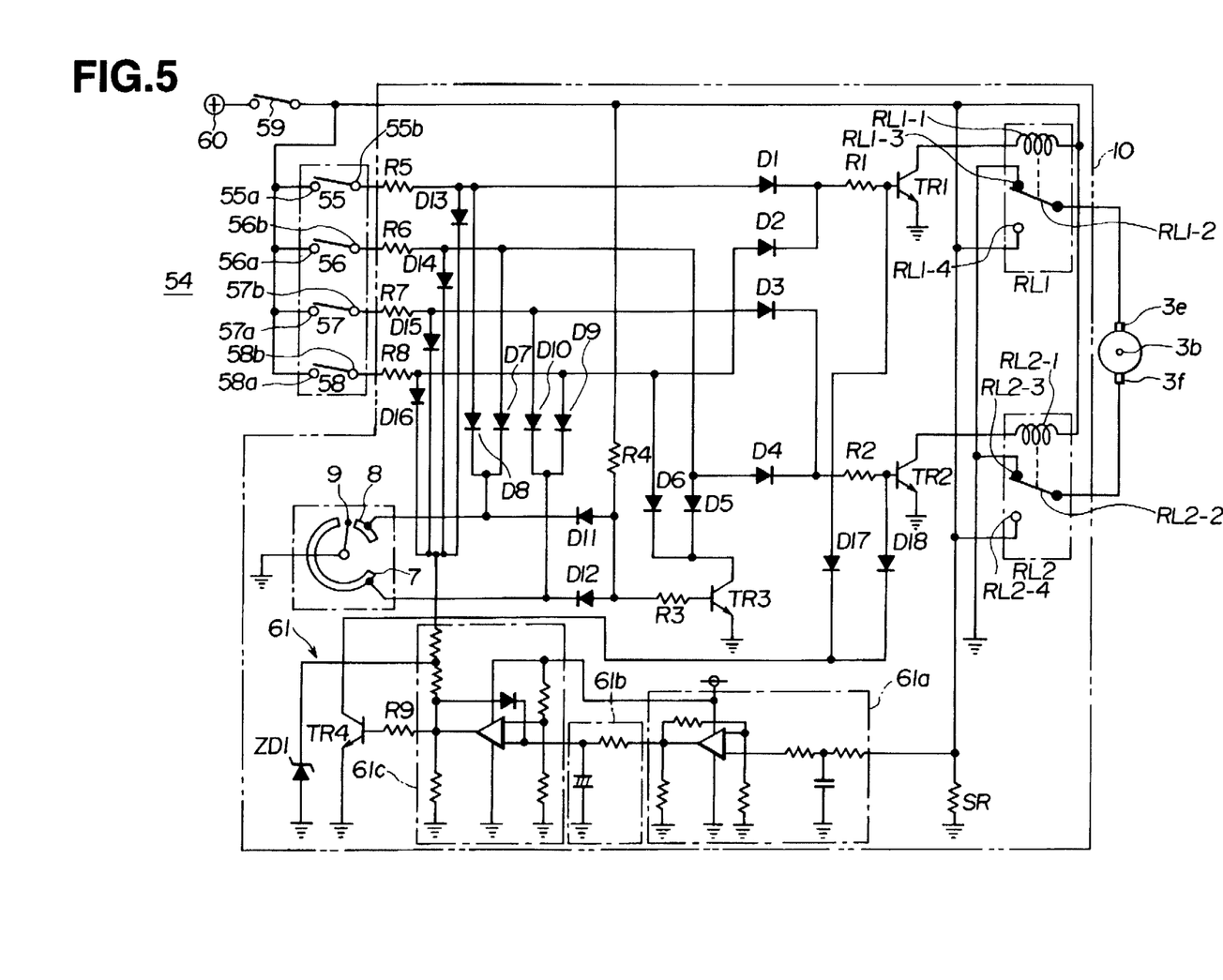
FIG. 5 is a circuit diagram of the sunroof control circuit house in the sunroof motor shown in FIG. 1.

A sunroof motor 1 shown in FIG. 1, and FIG. 2 is mainly composed of a case 2, an armature 3, an output shaft 4 and houses a controller 10 having a circuit configuration shown in FIG. 5 including a position detecting switch 50 which comprises a driving gear 5, a driven gear 6, a first contact plate 7, a second contact plate 8 and a contactor 9.

The case 2 is formed of a motor case 2a for housing the armature 3 and a gear case 2b for housing a worm wheel 11 and the output shaft 4, and an opening end of the motor case 2a is secured to the gear case 2b by screwing screw bolts 3g. The motor case 2a is secured with magnets 12 and 13 oppositely with each other on the inner side thereof.

The armature 3 housed in the motor case 2a is secured with an armature core 3a having coiling sections 3a1 corresponding to the predetermined number of slots on an armature shaft 3b, and provided with a commutator 3c adjacent to the armature core 3a.

The commutator 3c is provided with commutator pieces 3c1 of the number corresponding to that of the coiling sections 3a1 insulated with each other on the outer periphery thereof, and the armature coil 3d formed around the respective coiling sections 3a1 of the armature core 3a are connected to the respective commutator pieces 3c1.

The armature shaft 3b of the armature 3 is supported rotatably through a bearing 14 disposed in the motor case 2a on the opposite side of the opening end and another bearing (not shown) disposed in the gear case 2b.

Two brushes 3e and 3f are disposed so as to be in contact slidingly with the respective commutator pieces 3c1 of the commutator 3c and connected with the controller 10 of the sunroof control circuit 54 as shown in FIG. 5. Accordingly, the armature 3 turns in the forward direction by supplying an electric current in the forward rotational direction to the armature coil 3d from the controller 10 through the brushes 3e and 3f, and turns in the reverse direction by supplying an electric current in the reverse rotational. direction to the armature coil 3d from the controller 10 through the brushes 3e and 3f.

The armature shaft 3b of the armature 3 extrudes from the motor case 2a into the gear case 2b and formed with a worm (not shown), which is meshed with the worm wheel 11 shown in FIG. 2.

The worm wheel 11, which is provided with a damper-fitting recess 11a, is connected elastically to a hub 15 by fitting a rubber-made damper 16 attached to the hub 15 into the damper-fitting recess 11a of the worm wheel 11. The hub 15 is secured to the output shaft 4.

The output shaft 4 is supported rotatably at a shaft supporting part 2b1 formed in the gear case 2b, and fixed with an output gear 17 on the outside of the gear case 2b. The output gear 17 is connected with a driving wire (not shown) for actuating a sunroof lid, and the sunroof lid is so designed as to be tilted down or moved in the opening direction by the forward rotation of the output shaft 17 according to the forward rotation of the armature 3 through the driving wire and so designed as to be tilted down or moved the closing direction by the reverse rotation of the output shaft 17 according to the reverse rotation of the armature 3 through the driving wire.

The output shaft 4 is fixed with the driving gear 5 forming a part of the position detecting switch 50 for detecting the situation of the sunroof lid on the outside of the gear case 2b on the opposite side of the output gear 17. The driving gear 5 forms a part of an intermittent motion mechanism formed together with the driven gear 6 as described later, and is provided with two teeth 5a on the outer peripheral position. The driving gear 5 turns together with the output shaft 4.

Furthermore, the driven gear 6 forming another part of the position detecting switch 50 is disposed on the side of the driving gear 5.

The driven gear 6 is supported rotatably at a gear supporting part 2b2 formed projectingly in a point at a short distance from the driving gear 5 on the gear case 2b by screwing a screw bolt 18 so as not to be disconnected from the supporting part 2b2 of the gear case 2b. The driven gear 6 is provided with teeth 6a meshed with the teeth 5a of the driving gear 5 at the outer periphery and is so structured as to be rotated intermittently as much as a predetermined angle corresponding to one of teeth 6a while the driving gear 5 makes one revolution together with the output shaft 4. According to the intermittent rotation, the driven gear 6 turns in an anti-clockwise direction from point A to point B shown in FIG. 3 while the sunroof lid slides form the full-closed position to the full-opened position (sliding mode), and turns in a clockwise direction from point A to point C shown in FIG. 4 while the sunroof lid tilts from the full-closed position to the tilt up position (tilting mode).

The sunroof motor 1 is provided with a circuit board 19 between the gear case 2b and the driven gear 6, and provided with the first contact plate 7 and the second contact plate 8 forming the other part of the position detecting switch 50, and the controller 10 on the circuit board 19.

The driven gear 6 is secured with contactor 9 forming the residual part of the position detecting switch 50 on the side of the first and second contact plates 7 and 8.

Figure 3:
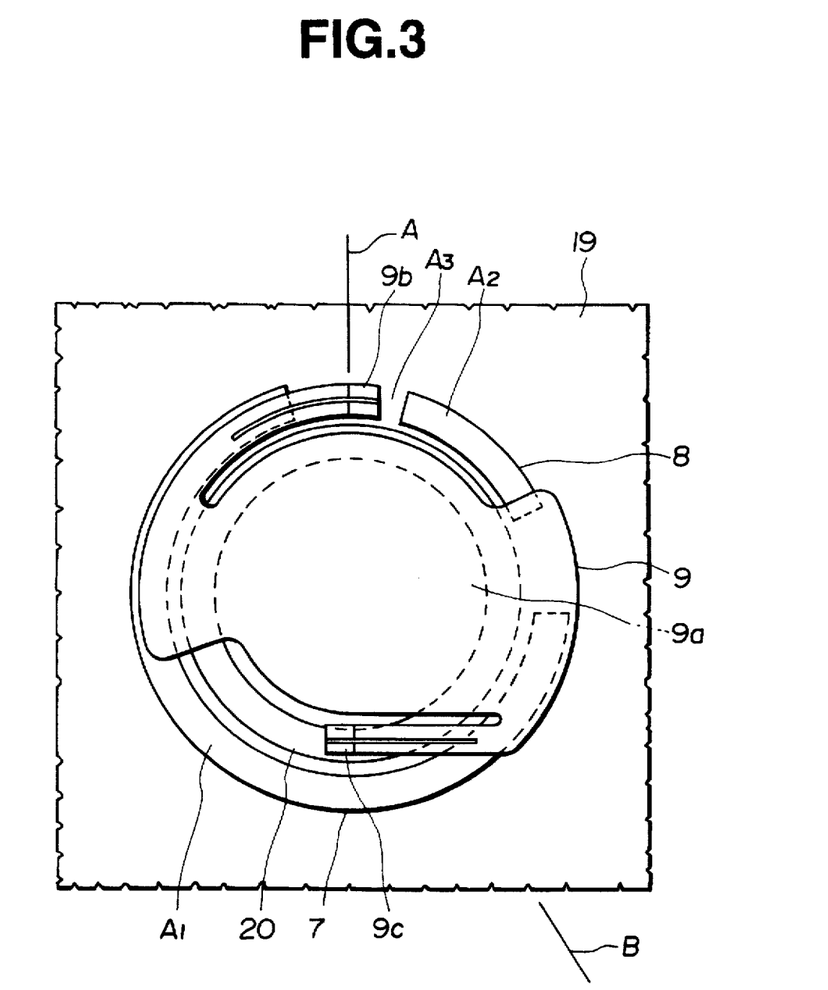
FIG.3 is a drawing to explain the operation of a position detecting switch in the sunroof motor shown in FIG. 1.

The first contact plate 7 and the second contact plate 8 are made of metallic plates or carbon films, and arranged in a circle with the same radius respectively on the outer side of the gear supporting part 2b2. The first contact plate 7 is formed on the circuit board 19 in an arcuate shape having a first conductive area A1 as shown in FIG. 3. The second contact plate 8 is also formed on the circuit board 19 in the same circle arranged with the first contact plate 7 in a state insulated from the first contact plate 7 in an arcuate shape having a second conductive area A2 as shown in FIG. 3, and a non-conductive area A3 corresponding to the point A of the driven gear 6 between the first and second contact plates 7 and 8.

The first contact plate 7 os connected to cathodes of diodes D9, D10, and D12 as shown in FIG. 5.

The second contact plate 8 is connected to cathodes of diodes D7, D8 and D11 as in FIG. 5.

The circuit board 19 is formed with a third contact plate 20 on the inner side of the first and second contact plates 7 and 8. The third contact plate 20 is formed in a ringed shape having a radius smaller than that of the first and second contact plates 7 and 8 and works in order to form an grounded circuit for the contactor 9 as described later.

On the one side, the contactor 9 is formed in a approximate circular shape from a metallic thin plate excellent in electric conductivity, and provided with a first contact piece 9b to be in contact electrically and slidingly with the first and second contact plate 7 and 8 on the outer side of a contactor body 9a formed in a flat shape and provided with a second contact piece 9c to be in contact electrically and slidingly with the third contact plate 20 on the inner side of the first contact piece 9b. The first and second contact pieces 9b and 9c are formed in a united one body as the contactor 9.

While the contactor 9 is rotated angularly in the aforementioned range together with the driven gear 6, the second contact piece 9c of the contactor 9 is always in contact with the third contact plate 20 so as to form the grounded circuit and the first contact piece 9b of the contactor 9 becomes in a state of being in contact with the first contact plate 7, in a state of being contact with second contact plate 8 and in a state of being out of contact with both of the first and second contact plates 7 and 8.

When the first contact piece 9b of the contactor 9 is connected to the first contact plate 7, cathodes of the diodes D9, D10 and D11 in the controller circuit 10 shown in FIG. 5 are made in low level since the first contact plate 7 is grounded through the contactor 9. The contactor 9 also makes cathodes of diodes D7, D8 and D11 in the controller 10 by grounding the second contact plate 8 when the first contact piece 9b is connected to the second contact plate 8. Furthermore, the contactor 9 makes the diodes D7, D8, D9, D10, D11 and D12 into floating states when the first contact piece 9b is out of contact with the both contact plates 7 and 8.

On the other side, the controller 10 of the sunroof control circuit 54 is composed of a first relay RL1, a second relay RL2, switching transistors TR1, TR2 and TR3, resistors D1, D2, D3, D4, D5, D6, D7, D8, D9, D10, D11 and D12, and a motor-lock detecting circuit 61 as shown in FIG. 5. The motor-lock detecting circuit 61 is formed by a current detecting resistor SR, an amplifier circuit 61a, a filter 61b, a comparator 61c, diodes D13, D14, D15 and D16, a zener diode ZD1, switching transistor TR4 and a resistor R9 so as to detect an electric current flowing in the armature coil 3d of the armature 3 through the current detecting resistor SR. Namely, in the motor-lock detecting circuit 61, the switching transistor TR4 is turned on according to a base current transformed through the amplifier circuit 61a, the filter 61b and the comparator 61c if the rotation of the armature shaft 3b of the armature 3 is restricted and the electric current flowing in the armature coil 3d exceeds the predetermined value when the sunroof lid arrives at the full-opened position or tilt up position. Accordingly, the switching transistor TR1 or TR2 is switched off, thereby cutting off the power supply to the armature coil 3d of the armature 3.

The sunroof control circuit 54 is connected with a switch means having a slide open switch 55 ("OPEN" switch), a slide close switch ("CLOSE" switch), a tilt up switch 57 ("TILT UP" switch) and a tilt down switch 58 ("TILT DOWN" switch) to the controller 10. Normally open fixed contacts 55a, 56a, 57a and 58a of the slide open switch 55, slide close switch 56, tilt up switch 57 and tilt down switch 58 are connected to power source 60, respectively through an ignition switch 59, and movable contacts 55b, 56b, 57b and 58b of the slide open switch 55, slide close switch 56, tilt up switch 57 and tilt down switch 58 are connected to ends of the resistors R5, R6, R7, and R8 of the controller 10, respectively.

Another end of the resistor R5 connected with the movable contact 55b of the slide open switch 55 is connected to anodes of the diodes D1 and D8, and the cathode of the diode D1 connected to one end of the resistor R1. Another end of the resistor R1 is connected to the base of the switching transistor TR1 of which emitter is grounded, and the collector of the switching transistor TR1 is connected to one end of a relay coil RL1-1 of the first relay RL1.

In the first relay RL-1, another end of the relay coil RL1-1 is connected to the power source 60 through the ignition switch 59 and one end of a relay coil RL2-1 of the second relay RL2, a movable contact RL1-2 is connected to the brush 3e of the sunroof motor 1 and a normally close fixed contact RL1-3 is grounded, furthermore a normally open fixed contact RL1-4, is connected to the power source 60 through the ignition switch 59.

Another end of the resistor R6 connected with the movable contact 56b of the slide close switch 56 is connected to anodes of the diodes D4, D5 and D7 respectively, and the cathode of the diode D4 is connected to one end of the resistor R2. The cathode of the diode D5 is connected to the collector of the switching transistor TR3 of which emitter is grounded, another end of the resistor R2 is connected to the base of the switching transistor TR2 of which emitter is grounded, and the collector of the switching transistor TR2 is connected to another end of the relay coil RL2-1 of the second relay RL2.

In the second relay RL2, one end of the relay coil RL2-1 is connected with another end of the relay coil RL-11 of the first relay RL1 as described above, a movable contact RL2-2 is connected to the brush 3f of the sunroof motor 1 and a normally close fixed contact RL2-3 is grounded, further a normally open fixed contact RL2-4 is connected to the power source 60 through the ignition switch 59.

Another end of the resistor R7 connected with the movable contact 57b of the tilt up switch 57 is connected to anodes of the diodes D3 and D10 respectively, and the cathode of the diode D3 is connected to one end of the resistor R2.

Furthermore, another end of the resistor R8 connected with the movable contact 58b of the tilt down switch 58 is connected to anodes of the diodes D2, D6 and D9 respectively, the cathode of the diode D2 is connected to one end of the resistor R1 and the cathode of the diode D6 is connected to the collector of the switching transistor TR3.

The diode D13 is connected with the resistor R5, the diode D14 is connected with the resistor R6, the diode D15 is connected with the resistor R7 and the diode D16 is connected with the resistor R8. When one of switches 55, 56, 57 and 58 is operated and becomes ON-state, reference voltage is supplied to the comparator 61c through the diode D13, D14, D15 or D16, thereby making the motor-lock detecting circuit 61 into the workable state. The reference voltage is stabilized by the zener diode ZD1.

The anode of the diode D12 of which cathode is connected to the first contact plate 7 is connected to one end of the resistor R3 and one end of the resistor R4 respectively, another end of the resistor R3 is connected to the base of the switching transistor TR3 and another end of the resistor R4 is connected with the power source 60 through the ignition switch 59.

The anode of the diode D11 of which cathode is connected to the second contact plate 8 is connected to one end of the resistor R4 and one end of the resistor R3.

In a state where the sunroof lid is in the full-closed position, the first contact piece 9b of the contactor 9 fixed to the driven gear 6 is situated in the point A shown in FIG. 3 and the first contact piece 9b is within the non-conductive area A3, therefore the first contact piece 9b of the contactor 9 is out of contact with both of the first and second contact plates 7 and 8. Since the cathodes of the diodes D7 and D8 are connected with the cathode of the diode D11 and the cathodes of the diodes D9 and D10 are connected with the cathode of the diode D12, all the diodes D7, D8, D9, D10, D11 and D12 are in non-conductive states. The transistor TR3 is supplied with a base current into the base through the resistors R4 and R3 and the transistor TR3 becomes in an on-state.

In this state, even if the slide close switch 56 is closed, an electric current flows through the slide close switch 56, the resistor R6, the diode D5 and the transistor TR3, but does not flow in the diode D4, the resistor R2, the transistor TR2 and the relay coil RL2-1 of the second relay RL2. Furthermore, even if the tilt down switch 58 is closed, an electric current flows through the tilt down switch 58, the resistor R8, the diode D6 and the transistor TR3, but does not flow in the diode D2, the resistor R1 and the relay coil RL1-1 of the first relay RL1. Accordingly, the brushes 3e and 3f of the sunroof motor 1 are not supplied with the electric current and so the armature 3 of the motor 1 does not work even if the slide close switch 56 or the tilt down switch 58 is operated into the on-state.

If the slide open switch 55 is switched on at the state the sunroof lid is closed and the movable contact 55b is connected with the normally open fixed contact 55a of the slide open switch 55, the switching transistor TR1 is supplied with a base current through the diode D1 and the resistor R1, and the transistor TR1 is switched on, whereby the relay coil RL1-1 of the first relay RL1 is excited, the movable contact RL1-.2 is connected with the normally open fixed contact RL1-4 and an electric current is supplied to the armature coil 3d of the armature 3 from the power source 60 through the brushes 3e and 3f in the forward rotational direction. Therefore, the armature shaft 3b of the sunroof motor 1 in the forward direction.

When the contactor 9 secured to the driven gear 6 begins to turn in the anti-clockwise direction shown in FIG. 3 according to the forward rotation of the armature shaft 3b, the first contact piece 9b of the contactor 9 is soon connected to the first contact plate 7 and the diode D12 becomes electrically conductive through the resistor R4, whereby the transistor TR3 becomes in the off-state and the sunroof lid is electrically detected to be in the condition away from the full-closed position, that is to be in the sliding mode.

When the sunroof lid is actuated in the opening direction by the forward rotation of the armature shaft 3b and arrives at the full-opened position before long, the rotation of the armature shaft 3b is restricted mechanically, a locking current flows in the armature coil 3d of the armature 3 and the electric current flowing in the resistor SR increases. Presently, the motor-lock detecting circuit 61 works as described above, transistor TR4 changes into the on-state and the electric current flows through the resistor R1, the diode D17 and the transistor TR4, thereby switching off the transistor TR1. Accordingly, the relay coil RL1-1 of the first relay RL1 changes into a unexcited state so that the movable contact RL1-2 is connected with the normally close fixed contact RL1-3. Consequently, a closed circuit connecting the movable contact RL1-2 and the normally close fixed contact RL1-3 of the first relay RL1, the movable contact RL2-2 and the normally close fixed contact RL2-3 of the second relay RL2, and brushes 3f and 3e is formed, thereby stopping the working of the sunroof motor 1. The comparator 61c has hysteresis, so that it maintains the transistor TR4 in the on-state even after the electric current flowing in the current detecting resistor SR is extinguished. Even if the slide open switch 55 is operated on continuously, the electric current is not supplied to the armature coil 3d through the brushes 3e and 3f, and so the sunroof lid remains at the full-opened position.

If the slide open switch 55 is switched off, the reference voltage supplied to the comparator 61c through the diode D13 becomes lower and the transistor TR4 changes into the off-state.

In this time, the contactor 9 stops in a state of being in contact with the first contact plate 7 after turning to the point B shown in FIG. 3 together with the driven gear 6. Accordingly, the tilting mechanism of the sunroof does not work even if the tilt up switch 57 or the tile down switch 58 is operated on in this state because the diodes D9 and D10 are grounded through the first contact plate 7 and the contactor 9 and the electric current flowing through the resistor R7 or R8 flows toward the first contact plate 7 and the contactor 9 through the diodes D9 and D10.

When the slide close switch 56 is switched on at the time the sunroof lid is in the full-opened position, the movable contact 56b is connected with the normally open fixed contact 56a and a base current is supplied to the switching transistor TR2 through the diode D4 and the resistor R2, thereby switching on the transistor TR2 and exciting the relay coil RL2-1 of the relay coil RL2-1 of the second relay RL2. Accordingly, the movable contact RL2-2 is connected to the normally open fixed contact RL2-4 and the armature shaft 3b of the sunroof motor 1 is rotated in the reverse direction owing to current supply in the reverse rotational direction from the power source 60 to the armature coil 3d of the armature 3 through the brushes 3f and 3e.

According to the reverse rotation of the armature shaft 3b, the contactor 9 secured to the driven gear 6 starts to turn in the clockwise direction shown in FIG. 3. While the first contact piece 9b of th e contactor 9 continues to be in contact with the first contact plate 7, the diode D12 is maintained in the on-state and the transistor TR3 is maintained in the off-state, whereby the sunroof lid is electrically detected to be in the sliding mode.

The sunroof lid is driven toward the full-closed position and the first contact piece 9b of the contactor 9 turning in the clockwise direction together with the driven gear 6 gets out of the first conductive area A1 formed by the first contact plate 7 and comes into the non-conductive area A3 at the time of arriving at the point A as shown in FIG. 3. Accordingly, the diode D12 becomes in the non-conductive state, and the switching transistor TR3 and the diode D5 become conductive since the base current is supplied again to the transistor TR3 through the resistors R4 and R3. Further, the base current supplied to the switching transistor TR2 through the diode D4 and the resistor R2 is devided into the diode D5 and the transistor TR3, and the transistor TR2 changes into the off-state immediately.

Owing to the off-state of the switching transistor TR2, the electric current ceases to flow in the relay coil RL2-1 of the second relay RL2, the movable contact RL2-2 is connected with the normally close fixed contact RL2-3 and the armature shaft 3b stops to rotate just at the time when the sunroof lid arrives at the full-closed position. Whereby the sunroof lid is stopped at the full-closed position.

In the state where the sunroof lid is in the full-closed position, the first contact piece 9b of the contactor 9 is situated in the non-conductive area A3 and is out of contact with the first contact plate 7 and the second contact plate 8, therefore all of the diodes D7, D8, D9, D10, D11 and D12 are in the non-conductive states. Accordingly, the sunroof lid is detected to be closed on basis of the conductive state of the transistor TR3 and the diodes D5 and D6.

If the movable contact 57b is connected with the normally open fixed contact 57a of the tilt up switch 57 by switching on the tilt up switch 57 when the sunroof lid is in the full-closed position, the switching transistor TR2 is switched on and the relay coil RL2-1 of the second relay RL2 is excited since the switching transistor TR2 is supplied with the base current through the resistor R7, the diode D3 and the resistor R2, and the electric current is supplied to the armature coil 3d of the armature 3 in the reverse rotational direction from the power source 60 through the brushes 3f and 3e owing to the connection between the movable contact RL2-2 and the normally open fixed contact RL2-4 of the second relay RL2, whereby the armature shaft 3b is rotated in the reverse direction.

In the time, although the transistor TR3 and the diode D5 are in the conductive states, the electric current flowing through the resistor R7 and the diode D3 is obstructed by the diode D4 and does not flow into the diode D5 and the transistor TR3.

Figure 4:
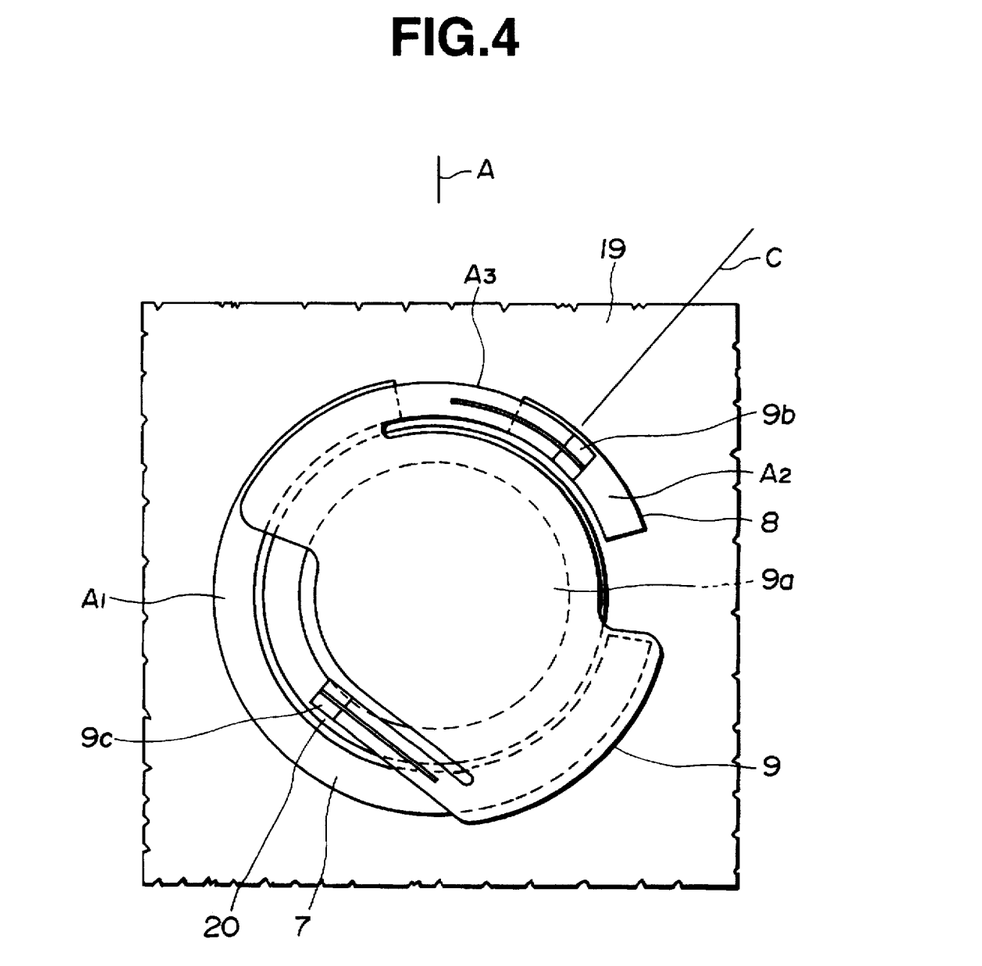
FIG. 4 is a like drawing to explain the operation of the position detecting switch.

The sunroof lid is driven in the tilting up direction by the reverse rotation of the armature shaft 3b at the time the sunroof lid is in the full-closed position. The contact piece 9b of the contactor 9 begins to turn in the clockwise direction from the point A as shown in FIG. 4 and is connected to the second contact plate 8 before long.

If the first contact piece 9b of the contactor 9 is connected to the second contact plate 8, the transistor TR3 and the diodes D5 and D6 change into the non-conductive states since the diode D11 becomes conductive through the resistor R4, and the sunroof lid is detected to be away from the full-closed position and in the tilting mode electrically.

The diodes D7 and D8 are grounded through the second contact plate 8 and the contactor 9 while the first contact piece 9b of the contactor 9 is connected with the second contact plate 8, therefore the electric current flowing through the resistor R5 or R6 flows to the second contact plate 8 and the contactor 9 and the sliding mechanism of the sunroof does not work even if the slide open switch 55 or slide close switch 56 is operated on.

When the sunroof lid is actuated up to the tilt up position, the rotation of the armature shaft 3b is locked mechanically, the locking current flows in the armature coil 3d of the armature 3 and the aforementioned motor-lock detecting circuit 61 works. According to the working of the motor-lock detecting circuit 61, the transistor TR4 and the diode D18 are switched into the conductive state so that the transistor TR2 changes into the off-state, the electric current ceases to flow in the relay coil RL2-1 of the second relay RL2, and the sunroof motor 1 stops to work. Even if the tilt up switch 57 is operated on continuously in this state, the electric current is not supplied to the armature coil 3d through the brushes 3f and 3e because of the off-state of the transistor TR2, therefore the sunroof lid remains at the tilt up position and the first contact piece 9b of the contactor 9 fixed on the driven gear 6 stops at the point C shown in FIG. 4 corresponding to the tilt up position of the sunroof lid. The transistor TR4 is maintained in the on-state even after the electric current flowing in the current detecting resistor SR is extinguished since the comparator 61c of the motor-lock detecting circuit 61 has hysteresis as described above, and the transistor TR2 is also maintained in the off-state.

If the tilt up switch 57 changes into the off-state, the reference voltage supplied to the comparator 61c through the diode D15 becomes lower and the transistor TR4 becomes in the off-state.

When the movable contact 58b is connected with the normally open fixed contact 58a by switching on the tilt down switch 58 in the state where the sunroof lid is in the tilt up position, the switching transistor TR1 is switched on and the relay coil RL1-1 of the first relay RL1 is excited because the switching transistor TR1 is supplied with the base current through the resistor R8, the diode D2 and the resistor R1, and the movable contact RL1-2 is connected with the normally open fixed contact RL1-4 of the first relay. RL1, the armature shaft 3b is rotated in the forward direction in response to the current supply to the armature coil 3d of the armature 3 from the power source 60 in the forward rotational direction through the brushes 3e and 3f.

According to the forward rotation of the armature shaft 3b, the contactor 9 secured on the driven gear 6 begins to turn in the anti-clockwise direction shown in FIG. 4. While the first contact piece 9b of the contactor 9 is in contact with the second contact plate 8, the diode D11 is held in the on-state and the transistor TR3 is maintained in the off-state. Whereby the sunroof lid is electrically detected to be in the tilting mode.

The sunroof lid is driven toward the full-closed position and the first contact piece 9b of the contactor 9 turning in the anti-clockwise direction together with the driven gear 6 gets out of the second conductive area A2 formed by the second contact plate 8 and comes into the non-conductive area A3 at the time of arriving at the point A corresponding to the full-closed position of the sunroof lid as shown in FIG. 4. Therefore, the diode D11 is mode non-conductive again, and the switching transistor TR3 and the diode D6 change into the on-states according to the base current supply to the transistor TR3 through the resistors R4 and R3.

Immediately, the base current supplied to the switching transistor TR1 through the diode D2 and the resistor R1 is devided into the diode D6 and the transistor TR3, and the switching transistor TR1 changes into the off-state.

According to the off-state of the switching transistor TR1, the electric current ceases to flow in the relay coil RL1-1 of the first relay RL1, the sunroof motor 1 stops to work and the armature shaft 3b stops to rotate just at the time when the sunroof lid arrives at the full-closed position, thereby stopping the sunroof lid at the full-closed position.

The position detecting switch 50 is so designed as to detect the sunroof lid to be in the full-closed position on basis of the disconnection between the contactor 9 and the first and second contact plates 7 and 8 when the first contact piece 9b of the contactor 9 is situated in the point A corresponding to the full-closed position of the sunroof lid. The detecting switch 50 is further so designed as to detect the sunroof lid to be in the sliding mode on basis of the connection between the contactor 9 and the first contact plate 7, and to detect the sunroof lid to be in the tilting mode on basis of the connection between the contactor 9 and the second contact plate 8.

As described above, according to this invention, very excellent effects can be obtained since it is possible to make the sunroof motor compactly by miniaturizing the position detecting switch and possible to control the sunroof lid appropriately according to the present position of the sunroof lid detected by the position detecting switch very accurately. Namely, the sunroof lid is never actuated even if the slide close switch or the tilt down switch is operated on when the sunroof lid is in the full-closed position, even if the slide open or slide close switch is operated on when the sunroof lid is in the tilting mode, even if the tilt up or tilt down switch is operated on when the sunroof lid in the sliding mode.

What is claimed is:

1. A sunroof control circuit for controlling a sunroof lid of a vehicle having a sliding mode and a tilting mode, the control circuit comprising:

an electric motor provided with a reduction gear and a position detecting gear operatively connected to said reduction gear;

a first motor driving circuit connected to said electric motor for supplying the electric motor with an electric current to turn said electric motor in a forward rotational direction;

a second motor driving circuit connected to said electric motor for supplying the electric motor with an electric current to turn said electric motor in a reverse rotational direction;

a position detecting switch provided with a movable conductive contact rotatively driven by said position detecting gear which is driven through the reduction gear of said electric motor, an insulating base plate, and arc-shaped first and second contact plates made of conductor plates and disposed coaxially and separate from each other on said insulating base plate, said first and second contact plates being selectively connected with said movable contact;

a switch means including a first switch for generating a first driving signal to open said sunroof lid and supplying the first driving signal to said first motor driving circuit, a second switch for generating a second driving signal to close said sunroof lid and supplying the second driving signal to said second motor driving circuit, a third switch for generating a third driving signal to tilt up said sunroof lid and supplying the third driving signal to said second motor driving circuit, and a fourth switch for generating a fourth driving signal to tilt down said sunroof lid and supplying the fourth driving signal to said first motor driving circuit; and a first prohibition circuit connected to said position detecting switch for prohibiting the second driving signal generated from said second switch to be supplied into the second motor driving circuit and prohibiting the fourth driving signal generated from said fourth switch to be supplied into the first motor driving circuit when the movable contactor is not in contact with the first nor the second contact plate of said position detecting switch, for permitting the second driving signal generated from the second switch to be supplied into the second motor driving circuit when the movable contactor is in contact with the first contact plate of said position detecting switch, and for permitting the fourth driving signal generated from the fourth switch to be supplied into the first motor driving circuit when the movable contactor is in contact with the second contact plate of said position detecting switch.

2. A sunroof control circuit as set forth in claim 1, wherein the control circuit is further provided with:

a second prohibition circuit connected to said first and second switches and the second contact plate of said position detecting switch for prohibiting the first driving signal generation from the first switch to be supplied into the first motor driving circuit and prohibiting the second driving signal generated from the second switch to be supplied into the second motor driving circuit when the movable contactor is in contact with the second contact plate of said position detecting switch; and a third prohibition circuit connected to said third and second switches and the first contact plate of said position detecting switch for prohibiting the third driving signal generated from the third switch to be supplied into the second motor driving circuit and prohibiting the fourth driving signal generated from the fourth switch to be supplied into the first motor driving circuit when the movable contactor is in contact with the first contact plate of said position detecting switch.

3. A sunroof control circuit as set forth in claim 1, wherein the control circuit is further provided with a motor-lock detecting circuit connected to said electric motor and said first and second motor driving circuits for detecting said electric motor to be locked, and for inhibiting the first driving signal generated from the first switch and the fourth driving signal generated from the fourth switch to be supplied into said first motor driving circuit and inhibiting the second driving signal generated from the second switch and the third driving signal generated from the third switch to be supplied into said second motor driving circuit.

4. A sunroof control circuit as set forth in claim 3, wherein said motor-lock detecting circuit is connected to said electric motor and provided with a resistor for detecting an electric current flowing in said electric motor.

5. A sunroof control circuit as set forth in claim 3, wherein said motor-lock detecting circuit is provided with a comparator supplied with reference voltage from said first, second, third or forth switch of the switch means.

6. A sunroof control circuit as set forth in claim 5, wherein said comparator has hysteresis.

7. A sunroof control circuit as set forth in claim 2, wherein the control circuit is further provided with a motor-lock detecting circuit connected to said electric motor and said first and second motor driving circuits for detecting said electric motor to be locked, and for inhibiting the first driving signal generated from the first switch and the fourth driving signal generated from the fourth switch to be supplied into said first motor driving circuit and inhibiting the second driving signal generated from the second switch and the third driving signal generated from the third switch to be supplied into said second motor driving circuit.

8. A sunroof control circuit as set forth in claim 1, wherein said position detecting switch is further provided with a third contact plate formed in a ringed shape from a metallic plate, disposed concentrically with said first and second contact plates on the insulating base plate, and connected electrically with said movable contactor.

9. A sunroof control circuit as set forth in claim 1, wherein said position detecting switch is further provided with a third contact plate formed in a ringed shape from carbon, disposed concentrically with said first and second contact plates on the insulating basal plate, and connected electrically with said movable contactor.

* * * * *